United States Patent [19]

Hälg et al.

[11] Patent Number: 4,751,137
[45] Date of Patent: Jun. 14, 1988

[54] COMPOSITE PANEL THAT IS DIFFICULT TO COMBUST AND PRODUCES LITTLE SMOKE, AND PROCESS FOR MANUFACTURING SAME

[75] Inventors: Paul Hälg, Winterthur; Harald Severus, Schaffhausen, both of Switzerland

[73] Assignee: Swiss Aluminum Ltd. - Research Laboratores, Neuhausen, Switzerland

[21] Appl. No.: 6,475

[22] Filed: Jan. 23, 1987

[51] Int. Cl.⁴ .................... B32B 7/10; B32B 7/12; B32B 15/00; B32B 31/04
[52] U.S. Cl. ................... 428/317.1; 156/310; 156/320; 156/321; 156/322; 428/317.9; 428/318.8; 428/319.1
[58] Field of Search ............... 428/317.1, 317.7, 318.4, 428/319.1, 318.6, 318.8, 317.9; 521/134, 145, 903, 907; 156/310, 320, 321, 322

[56] References Cited

U.S. PATENT DOCUMENTS

| | | | |
|---|---|---|---|
| 3,647,609 | 3/1972 | Cyba | 428/317.7 |
| 4,006,741 | 2/1977 | Arluck | 428/319.7 |
| 4,089,726 | 5/1978 | Ishii et al. | 428/518 |
| 4,473,608 | 9/1984 | Grundmann | 428/71 |

FOREIGN PATENT DOCUMENTS 1156135  11/1983  Canada .................... 428/317.7

Primary Examiner—William J. Van Balen
Attorney, Agent, or Firm—Bachman & LaPointe

[57] ABSTRACT

Composite panels with plastic core of polyvinylchloride and metal outer layers bonded to the core by means of adhesive layers, including those where flame retardant additives are incorporated in the plastic core, do not exhibit completely satisfactory properties for certain applications, in particular with respect to behavior under fire conditions viz., the creation of smoke. Composite panels having a plastic core of post-chlorinated polyvinylchloride or a mixture of the same with polyvinylchloride avoid these disadvantages.

20 Claims, 1 Drawing Sheet

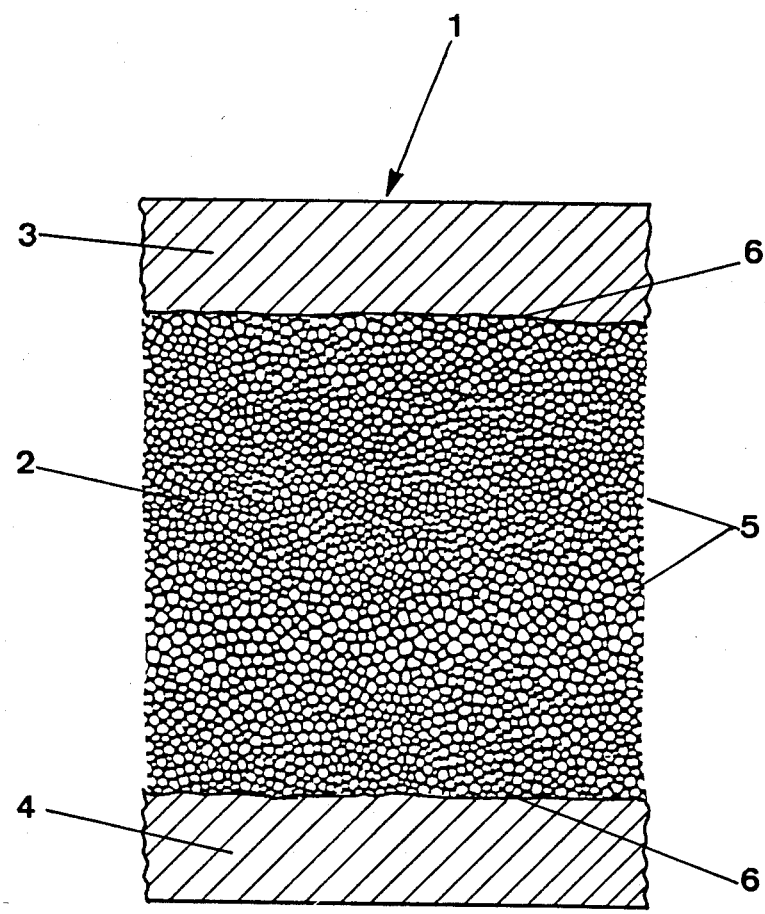

COMPOSITE PANEL THAT IS DIFFICULT TO COMBUST AND PRODUCES LITTLE SMOKE, AND PROCESS FOR MANUFACTURING SAME

BACKGROUND OF THE INVENTION

The invention relates to a composite panel that is difficult to combust, produces little smoke and can be shaped at room temperature by non-chip-forming methods, said panel comprising a core layer of thermoplastic plastic between metal outer sheets bonded to the same by adhesive layers, and relates also to a process for manufacturing the said composite panel.

Known composite panels that can be shaped at room temperature using non-chip-forming methods i.e. by bending, stretch drawing and/or stretch deep-drawing, have plastic cores of polyolefins or polyvinylchloride. A composite havinq a polyolefin core is classified according to the known specifications e.g. DIN 4102 as having "normal combustibility", which can result in limitations in its application.

A composite having a core of polyvinylchloride, in particular hard polyvinylchloride is classified according to DIN 4102 as being "difficult to combust" which permits a wider range of application.

A disadvantage of the hard polyvinylchloride core is however the amount of smoke it produces in a fire. Such core layers in the form of compact, hard polyvinylchloride exhibit smoke index values, measured according to ASTM E-84, of 900–1400 and in the form of foamed hard polyvinylchloride containing flame retardant, values of 500–1400. Such composite panels, containing a core having a smoke index value of more than 450, are not classified as materials of combustibility class 1 or class A of the US Building Model Codes; this standard is usually taken for reference purposes where national standards of that kind are lacking.

SUMMARY OF THE INVENTION

The object of the present invention is to develop a light composite panel of the foregoing type which is difficult to combust, produces little smoke and can be shaped plastically at room temperature, and to develop a process for manufacturing such a composite panel, by means of which the above mentioned disadvantages are avoided viz., in particular the unfavorable development Of smoke of the core in a fire, characterized by a smoke index value of more than 450 according to ASTM E-84. The composite panel should therefore be liqht, rigid, plastically formable at room temperature and difficult to combust (acc. to DIN 4102); the core should exhibit a smoke density index of less than 450 (acc. to ASTM E-84), so that the composite panel is classified as being of combustibility class 1 or A of the above mentioned US standard.

The object of the invention is achieved by a composite panel characterized by a thermoplastic core layer and metal outer layers which are joined together by means of adhesive layers, in which the core layer comprises a post-chlorinated polyvinylchloride containing inorganic filler and the adhesive layer between the core layer and the outer layer comprises two adhesive layers bonded to each other.

Because of its high viscosity in the molten state, post-chlorinated polyvinylchloride can be extruded or extrusion foamed only by means of considerable technical effort that requires special equipment which is not commercially available.

The further development of the composite panel according to the present invention is therefore particularly advantageous when the composite panel is characterized by a thermoplastic core layer and metal outer layers which are joined together by means of adhesive layers, in which the core layer comprises a mixture of hard polyvinylchloride and post-chlorinated polyvinylchloride containing inorganic filler and the adhesive layer between the core layer and the outer layer comprises two adhesive layers bonded to each other.

Further versions of the composite panel according to the invention are characterized by way of the features discussed hereinbelow. Thus the favorable smoke development behavior of post-chlorinated polyvinylchloride are combined with the favorable viscosity characteristics of hard polyvinylchloride during extrusion of foaming for the manufacture of the core layer.

A foamed core layer is, however, favorable for the composite panel according to the invention, this for reasons of a small amount of combustible material per unit volume, low weight of the panel which in accordance with the objective is to be light-weight, and a higher specific bending stiffness (E.J/g) compared with a compact core, wherein E: means kilo newton per square millimeters (i.e load per area)

J: means millimeters to the power 4 (i e. width, thickness to the power 3), and

G: means grams (i.e. weight of composite material).

With respect to the production of the panel according to the invention the object of the invention is achieved characterized by the process steps production of a compact or foamed core layer by extrusion; deposition of a layer of adhesive in the form of a thermoplastic adhesive film on both sides of the core layer; pre-heating the adhesive layer and the outer layer in a continuous heating furnace or over heated rolls; bonding together all layers by the application of pressure and heat. The further development of the process is wherein said foamed core layer is subjected to intensive cooling and smoothing as it leaves the extrusion tool in order to form a pore-free surface.

BRIEF DESCRIPTION OF THE DRAWING

The present invention will be more readily understandable from a consideration of the appended drawing which shows a cross-section of a composite panel of the present invention.

DETAILED DESCRIPTION

The production of the composite panel according to the invention can be both via a continuous production process or in a plurality of separate production steps.

In the continuous process it is advantageous first to mix post-chlorinated polyvinylchloride and hard polyvinylchloride as the main constituent along with the usual stabilizers and lubricants required for extrusion, flame retardant filler materials and possibly foaming substances, and namely in such ratios that a Cl-content of 55–72 wt.-% is obtained in the mixture. Preferred flame retardant filler materials are metal oxides such as $Sb_2O_3$; $MoO_3$; $Fe_2O_3$; $Cu_2O$; $CuO$; $NiO$; $ZnO$; $MgO$ and/or metal hydroxides such as $Al(OH)_3$; $2\ ZnO.3\ B_2O_3\ 3.5\ H_2O$ and/or metal carbonates such as $CaCO_3$, $MgCO_3$. The filler may be used and/or metal phosphates, in quantities of 1.0–50 wt.-%, preferably 3–10%, and grain sizes of 0.2–10 μm in diameter. The mixture is plasticized in an extruder and pressed through a shaping tool to form a 0.5–22 mm thick, up to 2000 mm broad strip. Preferably, the particles of inorganic filler material are, with respect to the weight of the filler material, coated with 2% stearic acid.

Preferably the plastic of the core layer contains between 30 and 95% of post-chlorinated polyvinylchloride and the post-chlorinated polyvinylchloride has a chlorine content of 63–72%. The density of this thermoplastic, compact or, as a result of foaming agents in the mixture, foamed plastic strip lies in the range 0.2–1.8 g/cm$^3$ and preferably 0.5–0.8 g/cm$^3$ and a thickness of 0.1–2 mm. In the case of the foamed plastic strip there is a plurality of more or less uniformly distributed pores 2–100 μm in diameter throughout the cross-section of the strip. The pores however do not appear at the surface of the strip in the form of a rough surface; instead they lie some μm below the surface so that the extruded, foamed plastic strip exhibits a smooth, pore-free surface.

In the next stage of the continuous production process the extruded plastic strip, which represents the core layer of the composite panel being manufactured, is coated with a suitable thermoplastic adhesive which is preferably deposited in the form of 10–200 μm thick thermoplastic adhesive foils that initially adhere to the core as a result of electrostatic forces of attraction. Preferably, at least one layer of the adhesive layers exhibits combustion and smoke inhibiting properties. Preferably also the layer of the adhesive on the side towards the outer layer is of a thermoplastic material bonding well to the outer layer, and the layer of adhesive on the side towards the core layer is of a thermoplastic material bonding well to the core layer, and at least one of the layers of adhesive is made flame retardant using a flame retardant substance for thermoplastics comprising a material selected from the group consisting of halogenated paraffins, antimony oxide and mixtures thereof.

On the application of pressure and heat the adhesive-coated core is combined in the further stages of the continuous production process along with pre-heated metal outer layers, in particular aluminum, aluminum alloys or steel of thickness 0.1–2 mm, to form a strip, symmetrical or unsymmetrical i.e. with both sides of different metal layers or of different thickness, that represents a composite with a laminar, sandwich type structure.

In this process of joining the outer layers to the core layer, also called lamination, the metal outer layers are unrolled from coils on so called spools and, after preheating by uncoiling rolls, drawn through a laminating device. The laminating device comprises machine elements such as pairs of rolls or moving caterpillar type tracks or backed steel strips that act on both sides of the composite strip moving or rolling with it and transferring pressure and heat to the said strip.

The heat and pressure applied in the laminating device effect the adhesive bonding of the metal outer layers to the plastic core with the aid of the above mentioned adhesive layers or foils.

After the composite strip has passed through the cooling zone to cool it down from the laminating temperature, a flying saw or transverse dividing unit situated after the last pair of rolls cuts the strip into individual composite panels.

One version for producing the composite panel according to the invention in a plurality of separate production steps is such that the extruded thermoplastic core layer is coiled. This coil is then installed on an uncoiling device at the input end of a laminating device corresponding to that employed in the continuous production process, uncoiled so that at the same time adhesive or adhesive foil is applied to both sides and, as described above for the continuous production process, clad on both sides with pre-heated metal outer layers. The resultant composite strip is finally divided transversely into composite panels.

In another version of the production of the composite panel according to the invention, in separate production steps the extruded thermoplastic core layer is divided into panel lengths that are then clad with metal outer sheets on a laminating device using adhesive layers. The adhesives can be deposited either on the metallic outer layers or on the plastic core of the composite or as adhesive foils between the core and the outer layers prior to the lamination step. The laminating device can be a device with rotating, heated pressure elements in the form of caterpillar tracks or steel strips that join the materials as they rotate applying pressure and heat to the same, or it can be a press with heated pressure plates.

An advantageous version of the composite panel according to the invention is illustrated schematically in the drawing. This shows in cross-section a composite panel 1 having a foamed core 2 with uniformly distributed gas pores 5 and, on both sides of the core 5, metal outer layers 3 and 4 which are bonded to the core layer with the aid of relatively thin adhesive layers 6.

The core 2 of the composite panel 1 comprises a mixture of hard polyvinylchloride and post-chlorinated polyviylchloride to which smoke and combustion suppressing inorganic fillers have been added. The gas pores 5 are created by the addition of a foaming agent to the polyvinylchloride mixture. As can be seen from the drawing the gas pores are always below the surface of the core layer 2 and produce therefore no recesses in the surface.

What is claimed is:

1. Composite panel that is difficult to combust, produces little smoke and can be shaped at room temperature, which comprises: a foamed thermoplastic core layer comprising a post-chlorinated polyvinylchloride containing inorganic filler; said layer including finely divided gas poers therein, with the finely divided gas pores situated under the surface of said core layer; metal outer layers joined to said core layer; and adhesive layers between said core layer and each of said metal layers comprising two adhesive layers bonded to each other.

2. Composite panel that is difficult to combust, produces little smoke and can be shaped at room temperature, which comprises: a foamed thermoplastic core layer comprising a mixture of hard polyvinylchloride and post-chlorinated polyvinylchloride containing inorganic filler; said layer including finely divided gas pores therein with the finely divided gas pores being situated under the surface of said core layer; metal outer layers joined to said core layer; adhesive layers between said core layer and each of said metal layers with the layer of the adhesive on the side towards each outer layer comprising a thermoplastic material which bonds well to the outer layer, the layer of adhesive on the side towards the core layer comprising a theremoplastic material which bonds well to the core layer, and at least one of the layers of adhesive is made flame retardant, using a flame retardant substance for thermoplastics comprising a material selected from the group consisting of halogenated paraffins, antimony oxide and mixtures thereof.

3. Composite panel according to claim 1 wherein the metal layers are selected from the group consisting of aluminum, an aluminum alloy, steel and mixtures thereof.

4. Composite panel according to claim 1 wherein at least one layer of the adhesive layers exhibits combustion and smoke inhibiting properties.

5. Composite panel according to claim 2 wherein the plastic of the core layer contains between 30 and 95% of post-chlorinated polyvinylchloride and the post-chlorinated polyvinylchloride has a chlorine content of 63-72%.

6. Composite panel according to claim 5 wherein the plastic of the core layer contains between 70 and 95% of post-chlorinated polyvinylchloride and the post-chlorinated polyvinylchloride has a chlorine content of 65-69%.

7. Composite panel according to claim 1 wherein the inorganic filler comprises in powder form from 1 to 50% of a material selected from the group consisting of metal oxide, a metal hydroxide, a metal carbonate, a metal phosphate and mixtures thereof.

8. Composite panel according to claim 7 wherein said filler is selected from the group consisting of $Sb_2O_3$, $MoO_3$, $Fe_2O_3$, $Cn_2O$, $CuO$, $NiO$, $ZnO$, $MgO$, $Al(OH)_3$, $CaCO_3$, $MgCO_3$, $2ZnO.3B_2O_3.3.5 H_2O$, and mixtures thereof.

9. Composite panel according to claim 7 wherein said filler has a grain size of 0.2–10 $\mu$m, and the concentration of inorganic filler in the core layer is 3–10%.

10. Composite panel according to claim 7 wherein the particles of inorganic filler material are, with respect to the weight of the filler material, coated with 2% stearic acid.

11. Composite panel according to claim 1 wherein the core layer has a density of 0.2–1.8 $g/cm^3$, and a thickness of 0.1–2 mm, and the outer layers have a thickness of 0.1–2 mm.

12. Composite panel according to claim 1 wherein the layer of the adhesive on the side towards the outer layer is of a thermoplastic material bonding well to the outer layer, and the layer of adhesive on the side towards the core layer is of a thermoplastic material bonding well to the core layer, and at least one of the layers of adhesive is made flame retardant, using a flame retardant substance for thermoplastics comprising a material selected from the group consisting of halogenated paraffins, antimony oxides and mixtures thereof.

13. Composite panel according to claim 2 wherein the metal layers are selected from the group consisting of aluminum, an alulminum alloy, steel mixtures thereof.

14. Composite panel according to claim 2 wherein the inorganic filler comprises in powder form form 1 to 50% of a material selected from the group consisting of metal oxide, a metal hydroxide, a metal carbonate, a metal phosphate and mixtures thereof.

15. Composite panel according to claim 2 wherein said filler is selected from the group consisting of $Sb_2O_3$, $MoO_3$, $Fe_2O_3$, $Cn_2O$, $CuO$, $NiO$, $Zno$, $MgO$, $Al(OH)_3$, $CaCO_3$, $MgCO_3$, $2ZnO.3B_2O_3.3.5 H_2O$, and mixtures thereof.

16. Composite panel according to claim 2 wherein said filler has a grain size of 0.2–10 $\mu$m, and the concentration of inorganic filler in the core layer is 3–10%.

17. Composite panel according to claim 2 wherein the particles of inorganic filler material are, with respect to the weight of the filler material, coated with 2% stearic acid.

18. Composite panel according to claim 2 wherein the core layer has a density of 0.2–1.8 $g.cm^3$, and a thickness of 0.1–2 mm, and the outer layers have a thickness of 0.1–2 mm.

19. Process for manufacturing a composite panel that is difficult to combust, produces little smoke and can be shaped at room temperature, which comprises: preparing a foamed thermoplastic core layer by extrusion using an extrusion tool, said layer comprising a post-chlorinated polyvinylchloride containing inorganic fillers; subjecting said foamed core layer to intensive cooling and smoothing as said layer leaves said extrusion tool in toder to form a pore-free surface; depositing two adhesive layers on each side of said core layer in the form of thermoplastic adhesive films; superimposing two metal outer layers on said adhesive layers to form a composite; heating the composite; and bonding together all layers by the application of pressure and heat.

20. Process according to claim 19 wherein the adhesive and outer layers are pre-heated.

* * * * *

UNITED STATES PATENT AND TRADEMARK OFFICE
CERTIFICATE OF CORRECTION

PATENT NO. : 4,751,137
DATED : June 14, 1988
INVENTOR(S) : Paul Halg and Harald Severus It is certified that error appears in the above-identified patent and that said Letters Patent is hereby corrected as shown below:

Column 1, line 19, change "havinq" to --having--

Column 1, line 48, change "Of" to --of--

Column 2, line 66, change "3.5" to --.3.5--

Column 4, claim 1, line 49, change the word "poers" to --pores--

Column 6, claim 15, line 17, change "Zno" to --ZnO--

Column 6, claim 18, line 28, change "g.cm$^3$" to --g/cm$^3$--

Column 6, claim 19, line 33, change "temperature" to --temperatures--

Column 6, claim 19, line 39, change "toder" to --order--

Signed and Sealed this

Fifteenth Day of November, 1988

Attest:

DONALD J. QUIGG

*Attesting Officer*     *Commissioner of Patents and Trademarks*